March 3, 1931.   M. B. JACKSON   1,794,461
BRAKE CONTROL MECHANISM
Filed April 17, 1929

INVENTOR:
MAUNSELL B. JACKSON.
BY   Marks & Clerk
ATTORNEYS.

Patented Mar. 3, 1931

1,794,461

UNITED STATES PATENT OFFICE

MAUNSELL B. JACKSON, OF TORONTO, ONTARIO, CANADA

BRAKE-CONTROL MECHANISM

Application filed April 17, 1929, Serial No. 355,867, and in Great Britain February 26, 1929.

This invention relates to brake control mechanism and its object is to provide a control mechanism for motor car brakes which will operate the brakes without requiring considerable muscular effort on the part of the driver and will preferably also, have a modicum of automatic action especially when the engine of the car stalls.

With this object in view the invention consists in the construction, combination and arrangement of parts hereinafter described and more particularly pointed out in the appended claims.

Referring now to the accompanying drawings, which illustrate, by way of example, one convenient embodiment of the invention:

Figure 1 also shows the latching position of the manually operated releasing lever.

Figure 2:
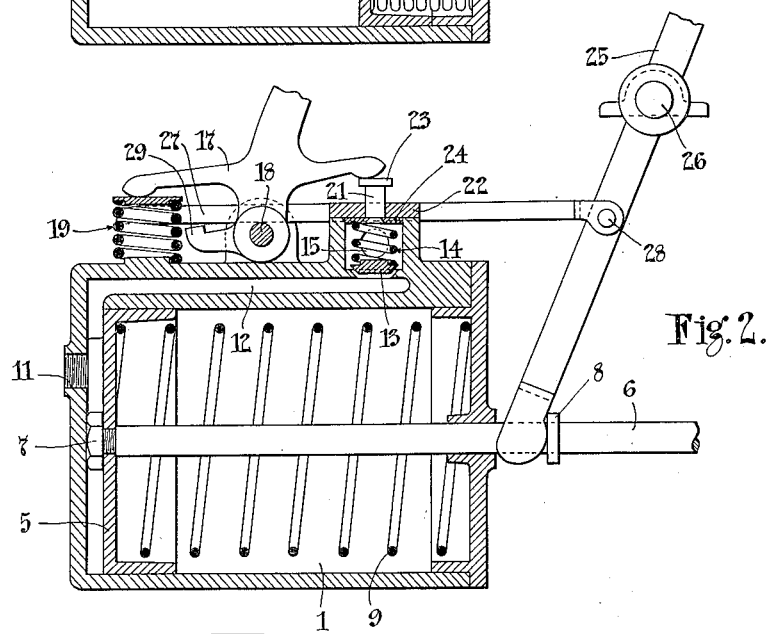
Figure 2 is a partial longitudinal section of the brake operating mechanism showing the operating lever in brake applying position.
Figure 3:
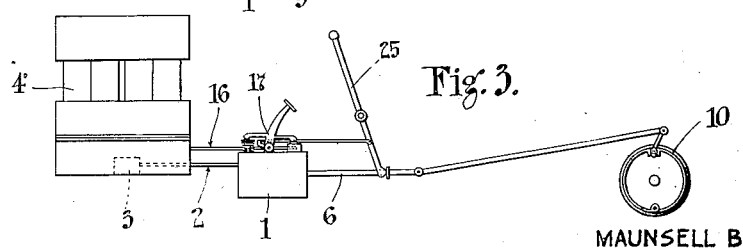
Figure 3 is a diagrammatic elevation, indicating the brake and pressure fluid connections.

In the illustrated example the numeral 1 indicates a cylinder attached in any suitable manner to a source of fluid under pressure. For example, the cylinder may be connected by a pipe 2 to the oil pump 3 of the engine 4. A piston 5 is slidably mounted in cylinder 1. A piston rod 6 is fastened to the piston 5 by a nut 7 and carries collar 8. A spring 9 tends to force piston 5 to the left as shown in Figure 2, in which position rod 6 applies the brake 10 of the car. Spring 9 is shown in cylinder 1 and acting directly on piston rod 5, as this is a convenient arrangement, but spring 9, or other means tending normally to apply the brake, may be carried in any other convenient place and may act on the brake bands directly or on any part of the brake controlling mechanism provided that its force tends to apply the brakes. 11 is a hole or port to which pipe 2 is connected and through which fluid under pressure from pump 3 enters cylinder 1 and forces piston 5 to the right, thereby overcoming the force of spring 6 and holding the car brakes off.

12 is a passage or port in cylinder 1 through which the fluid escapes when the brake is applied and which is controlled by relief valve 13, the pressure in cylinder 1 being proportional to the strength and length of a spring 14 which tends to hold valve 13 on its seat. The exhausted fluid escapes through a hole or port 15 which, if desired, may be connected by a pipe 16 to an oil pump. 17 is a brake operating lever pivoted at 18 and rocked about pivot 18 in a clockwise direction by the spring 19 which is stronger than, and thus overcomes, spring 14; and rocked about pivot 18 in a counterclockwise direction by manual pressure on the pedal 20 on the upper end of lever 17. 21 is a plunger mounted in a bore in cap 22 and having a head 23 integral therewith or rigidly fastened thereto. The upper end of plunger 21 acts as a stop to limit the clockwise movement of lever 17 and the lower end presses on the disk or washer 24 which acts as an abutment for spring 14.

The strength of spring 14 when plunger 21 is down with head 23 pressing on cap 22 is so proportioned that the fluid pressure in cylinder 1 is sufficient to force piston 5 fully to the right against spring 9 and hold the brakes off and the length and strength of spring 10 are so proportioned that when plunger 21 is fully up, that is when lever 17 is in its extreme counterclockwise position, there is practically no super-atmospheric pressure in cylinder 1 and spring 9 will then force piston 2 to the left and thus apply the car brakes.

Figure 1:
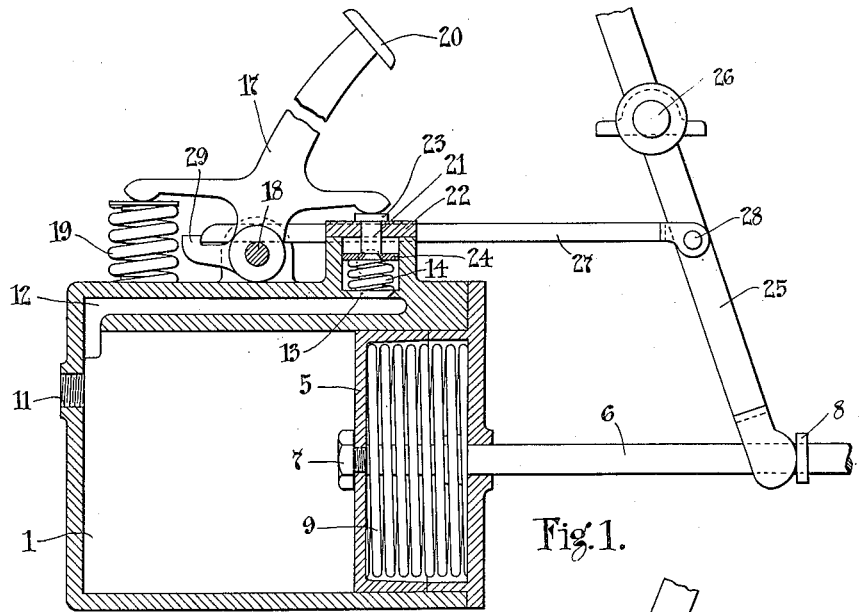
Figure 1 is a partial longitudinal section of the improved brake operating mechanism showing the operating lever in the position it occupies when the fluid pressure is holding the brakes off.

The operation of the device is as follows: Starting with the position shown in Figure 1 and with the fluid pressure in cylinder 1 at a maximum and the car brakes forced off; the operator, desiring to stop the car, presses on the pedal 20 rocking the lever 17 in a counterclockwise direction, thus relieving the pressure on spring 14 and reducing the fluid pressure in cylinder 1 by the desired amount.

Spring 9 then forces piston 5 to the left until equilibrium is again established between the lessened fluid pressure on one side of the piston 5 and the spring pressure on the other side. It is thus evident that the position of piston 5 is dependent upon the position of lever 17.

A complete means of controlling the car brakes when there is fluid pressure available to overcome the force of spring 9 is thus provided, but as the source of fluid pressure is usually a pump operated by the engine, pressure is not always available, as for example when the engine stalls on a hill in which case the brakes would go on and the car be stopped until the fluid pressure were restored, which cannot always be done. To release the brakes in such a situation a lever 25 is provided, which is hinged at 26 and cooperating with collar 8, which lever on being pushed to the left at the top will force piston rod 6 to the right, compressing spring 9 and holding the brakes off. For the purpose of holding lever 20 in the "off" position, an arm 27 is provided, which is hinged on lever 25 at 28 and which cooperates with a projection 29 on brake operating lever 17. The projection engages the left hand end of arm 27 when the brake operating lever 17 is in its extreme clockwise position, that is when the foot is not pressed on pedal 20. The arm 27 when engaged by projection 29 will hold the brake "off" until it is released, irrespective of whether there is fluid pressure available or not and the car may be towed or pushed, the braking being obtained by use of the emergency brake. It is evident that the lever 25 might be put into engagement with projection 29 and thus the fluid controlled brakes be put out of action unknown to the driver, in which case when the first occasion arose to apply the brakes the driver would naturally press on pedal 20 and expect the brake to operate, and if no provision were made to cause the release of lever 27 when the pedal 27 was pushed down, a serious accident might result.

This provision is obtained by the fact that the projection or stop 29 on brake operating lever 17 will only cooperate with and prevent the end of the arm 27 from coming freely to the left when the lever 12 is in its extreme clockwise position, so that when the driver presses on pedal 20 and rocks lever 17 in the normal way to apply the brake he will thereby automatically trip arm 27 off stop 29 and release the lever 25 to permit the spring 6 to apply the brakes. The outer end of the lever 27 is supported in any suitable manner, as by means of the pivot pin 18.

I claim:

1. The combination with a brake, of means tending to apply the brake, fluid pressure means normally holding the brake out of action, a brake operating lever, manually operable means for holding said brake applying means out of action if said fluid pressure means be inoperative, and means actuated by said brake operating lever for releasing said manually operable means when said brake operating lever is moved to apply the brake.

2. Brake control means comprising a cylinder, a piston in said cylinder, a rod connected to said cylinder and passing through one end wall of said cylinder, a fluid inlet in the other end of said cylinder, spring means constantly tending to urge said piston toward said inlet, a fluid outlet communicating with the end of the cylinder adjacent said inlet, a valve interposed between said inlet and outlet, a spring tending to close said valve, a plunger coacting with said valve, a manually operated lever engaging said plunger, a stronger spring urging said lever to cause it normally to compress said valve closing spring.

3. Brake control means as claimed in claim 2, comprising also a pivoted manually operated arm engaging said piston rod, a projection on the manually operated lever, and a member pivoted to said arm and coacting with said projection to hold the brake "off" positively, but arranged to be automatically disengaged from said projection when the manually operated lever is operated to apply the brake.

In testimony whereof I affix my signature.

MAUNSELL B. JACKSON.